US010430239B2

United States Patent
Tang et al.

(10) Patent No.: US 10,430,239 B2
(45) Date of Patent: Oct. 1, 2019

(54) METHOD AND SYSTEM FOR PREDICTING TASK COMPLETION OF A TIME PERIOD BASED ON TASK COMPLETION RATES OF PRIOR TIME PERIODS USING MACHINE LEARNING

(71) Applicant: Clari Inc., Sunnyvale, CA (US)

(72) Inventors: Lei Tang, Sunnyvale, CA (US); Mark Shuai Sun, Sunnyvale, CA (US); Xin Xu, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 103 days.

(21) Appl. No.: 15/246,513

(22) Filed: Aug. 24, 2016

(65) Prior Publication Data

US 2018/0060122 A1 Mar. 1, 2018

(51) Int. Cl.
G06F 9/48 (2006.01)
G06F 17/18 (2006.01)

(52) U.S. Cl.
CPC ............ *G06F 9/4887* (2013.01); *G06F 17/18* (2013.01)

(58) Field of Classification Search
CPC ...... G06Q 30/202; G06F 9/4887; G06F 17/18
See application file for complete search history.

(56) References Cited

U.S. PATENT DOCUMENTS

| | | | | |
|---|---|---|---|---|
| 7,480,623 B1 * | 1/2009 | Landvater | ........ | G06Q 10/06315 705/7.25 |
| 2003/0068097 A1 * | 4/2003 | Wilson | ........... | G06F 17/18 382/276 |
| 2009/0138301 A1 * | 5/2009 | Wan | .................. | G06Q 10/0631 705/7.31 |
| 2009/0216571 A1 * | 8/2009 | Sunshine | ............ | G06Q 10/02 705/5 |
| 2014/0304034 A1 * | 10/2014 | Mitchell | ........... | G06Q 30/0202 705/7.31 |
| 2016/0150280 A1 * | 5/2016 | Cui | ...................... | H04N 21/252 725/14 |

(Continued)

OTHER PUBLICATIONS

Unknown Author, R-Isotonic Monotone Regression, 2003 (Year: 2003).*

(Continued)

*Primary Examiner* — Francisco J Aponte
*Assistant Examiner* — Kevin X Lu
(74) *Attorney, Agent, or Firm* — Womble Bond Dickinson (US) LLP (57) ABSTRACT

A request is received from a client for determining task completion of a first set of tasks associated with attributes, the first set of tasks scheduled to be performed within a first time period. For each of the attributes, a completion rate of one or more of a second set of tasks is calculated that are associated with the attribute. The second set of tasks has been performed during a second time period in the past. An isotonic regression operation and/or temporal smoothing are performed on the completion rates associated with the attributes of the second set of tasks that have been performed during the second time period to calibrate the completion rates. Possible completion for the attributes of the first set of tasks to be performed in the first time period is calculated based on the calibrated completion rates of the second set of tasks.

19 Claims, 9 Drawing Sheets

(56) References Cited

U.S. PATENT DOCUMENTS

2016/0155137 A1* 6/2016 Harsha .............. G06Q 30/0202
 705/7.31
2017/0286978 A1* 10/2017 Govindarajan .... G06Q 30/0202
2018/0005171 A1* 1/2018 Harsha ................ G06Q 10/087
2018/0005253 A1* 1/2018 Megahed ............ G06Q 10/067

OTHER PUBLICATIONS

Kapoor, S. G., et al, "Modeling and Forecasting Sales Data by Time Series Analysis," Journal of Marketing Research, vol. 18, No. 1, Feb. 1981, pp. 94-100.

* cited by examiner

|  | Attribute 1 (e.g., closed) 301 | Attribute 2 (e.g., committed) 302 | Attribute 3 (e.g., best case) 303 | Attribute 4 (e.g., pipeline) 304 | Attribute 5 (e.g., omitted) 305 |
|---|---|---|---|---|---|
| Past Period 311 | 1 | 8 | 25 | 40 | 10 |
| Past Period Completion 312 | 1 | 6 | 10 | 5 | 0 |
| Past Period Completion Rate 313 | 100% | 75% | 40% | 12.5% | 0% |
| Current Period 314 | 2 | 10 | 20 | 50 | 5 |
| Projected Current Period Completion 315 | 2 * 100% = 2 | 10 * 75% = 7.5 | 20 * 40% = 8 | 50 * 12.5% = 6.25 | 5 * 0% = 0 |

FIG. 3

| Attributes | Task Data 401 | Completion Rates 402 |
|---|---|---|
| Attribute 1 (e.g., closed) 411 | 10 | 100% |
| Attribute 2 (e.g., committed) 412 | 50 | 60% |
| Attribute 3 (e.g., best case) 413 | 100 | 20% |
| Attribute 4 (e.g., pipeline) 414 | 200 | 10% |
| Attribute 5 (e.g., omitted) 415 | 2 | 10% |

FIG. 4B

| Attributes | Task Data 401 | Completion Rates 402 |
|---|---|---|
| Attribute 1 (e.g., closed) 411 | 10 | 100% |
| Attribute 2 (e.g., committed) 412 | 50 | 60% |
| Attribute 3 (e.g., best case) 413 | 100 | 20% |
| Attribute 4 (e.g., pipeline) 414 | 200 | 10% |
| Attribute 5 (e.g., omitted) 415 | 2 | 80% |

| | Attribute 1 (e.g., closed) 601 | Attribute 2 (e.g., committed) 602 | Attribute 3 (e.g., best case) 603 | Attribute 4 (e.g., pipeline) 604 |
|---|---|---|---|---|
| Current Period 611 | 5 | 10 | 20 | 40 |
| Past Period 1 612 | 2 | 4 | 8 | 16 |
| Past Period 2 613 | 10 | 10 | 10 | 10 |
| Normalized Current Period 621 | 5/40 = 0.125 | 10/40 = 0.25 | 20/40 = 0.5 | 40/40 = 1 |
| Normalized Past Period 1 622 | 2/16 = 0.125 | 4/16 = 0.25 | 8/16 = 0.5 | 16/16 = 1 |
| Normalized Past Period 2 623 | 10/10 = 1 | 10/10 = 1 | 10/10 = 1 | 10/10 = 1 |

(12) United States Patent
US 10,430,239 B2

METHOD AND SYSTEM FOR PREDICTING TASK COMPLETION OF A TIME PERIOD BASED ON TASK COMPLETION RATES OF PRIOR TIME PERIODS USING MACHINE LEARNING

FIELD OF THE INVENTION

Embodiments of the present invention relate generally to data processing by a data processing system. More particularly, embodiments of the invention relate to predicting task completion of a time period based on task completion rates of prior time periods using machine learning.

BACKGROUND

Forecasting and projecting progress of tasks, projects, or opportunities is prevalent across all different organizations. Both resource planning and company's executives rely on an accurate projection. Conventional practice is to ask each person (e.g., project manager, account representative, designer) to gather rough estimates and aggregate the information to provide an overall projection. However, such projections are based on the gut feelings of individuals. Such projections tend to be inaccurate and the process is inefficient.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a forecast engine is utilized to predict task completion of tasks to be performed during a time period based on historical task completion data of one or more past time periods using machine learning techniques. The forecast engine first computes the historical completion rates of the tasks performed during a past time period (e.g., end of quarter to the same relative day as the current date in the quarter) by some relevant attributes of the tasks or opportunities. The forecast engine intelligently smoothens and selects the completion rates to be applied to the current time period, such the projection is more accurate.

In one embodiment, a request is received from a client for determining a task completion rate of a first set of tasks associated with a set of attributes. The first set of tasks has been scheduled to be performed during a first time period (e.g., a current time period). In response to the request, for each of the attributes, a completion rate of one or more of a second set of tasks corresponding to the attribute is calculated. The second set of tasks has been performed during a second time period in the past. The completion rate represents a percentage of the second set of tasks that have been completed during the second time period. An isotonic regression operation is performed on the completion rates associated with the attributes of the second set of tasks to calibrate the completion rates. The completion rates for the attributes of the first set of tasks are predicted based on the calibrated completion rates of the second set of tasks.

In one embodiment, the term of "task" refers to any task performed or to be performed in a current time period or a past time period. A task can be a project (e.g., a software development project) performed or to be performed over a period of time. A task can be a sales contact or opportunity or deal negotiated or to be negotiated (e.g., closed). For the purpose of illustration, throughout this application, a sales opportunity or sales deal is utilized as an example of a task, however, other types of tasks may also be applied herein.

Figure 1A:
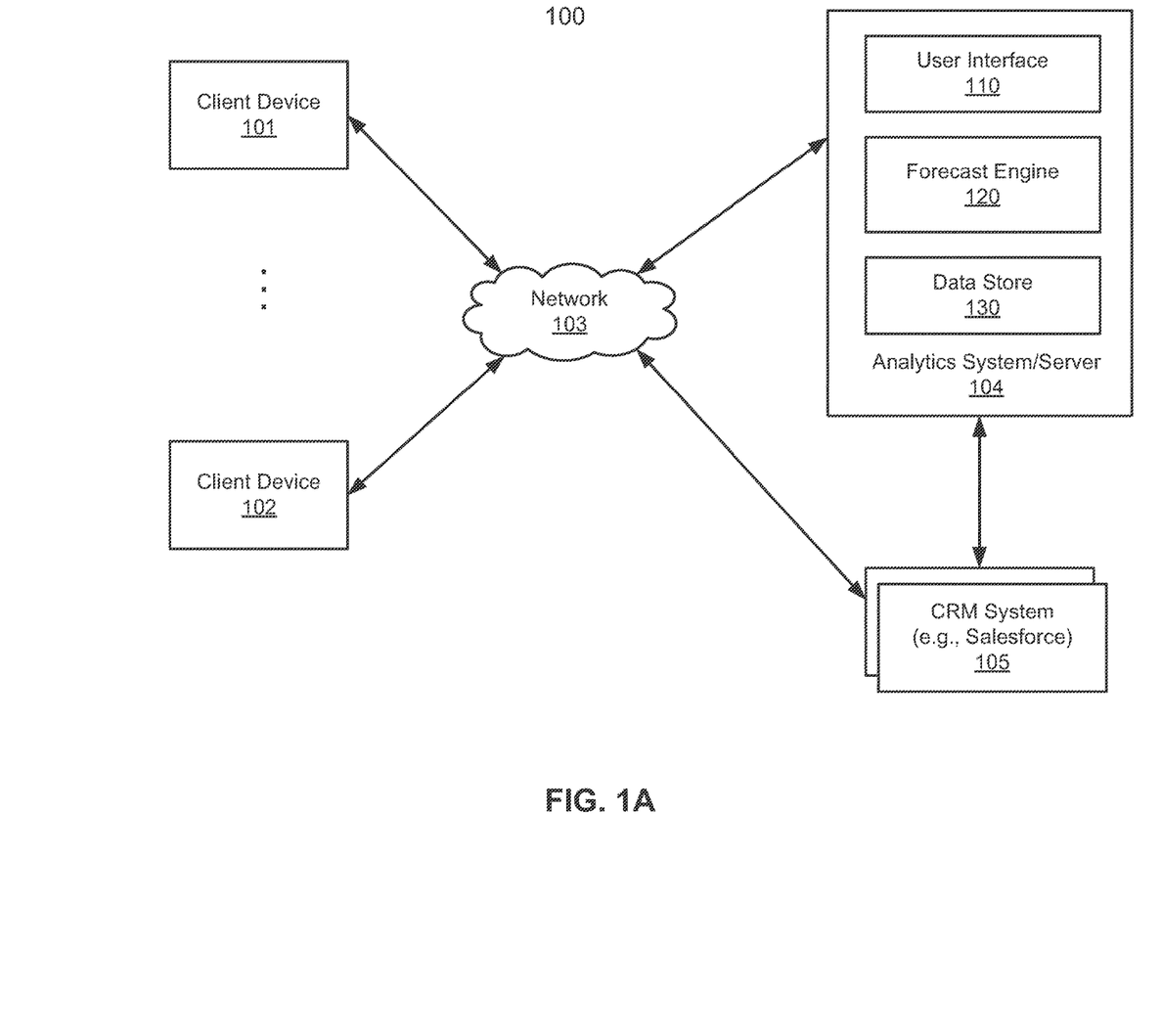
FIGS. 1A and 1B are block diagrams illustrating a network configuration according to certain embodiments of the invention.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

CRM system 104 provides CRM services to a variety of clients, which may be periodically or constantly accessed and updated by the clients for managing their sales data or other project management data. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, data analytics system or sever 104 provides data analytics services to clients 101-102 based on CRM data provided by CRM system 105 as a data source. Note that although there is only one CRM system shown, multiple CRM systems may also be implemented, where data analytics system 104 may be implemented as a multi-tenancy system that can access multiple CRM systems concurrently. For example, a user of client device 101 may be associated with a first organization as a first corporate client to data analytics system 104, while a user of client device 102 may be associated with a second organization as a second corporate client to data analytics system 104. The first and second organizations may employ different ones of CRM systems 105. Also note that a CRM system is utilized as an example of data sources, however, other types of data sources or systems can also be applied.

In one embodiment, data analytics system 104 includes, but is not limited to, user interface 110, forecast engine 120, and data store 130. User interface 110 can be any kind of user interface (e.g., Web, graphical user interface or GUI, or command line interface or CLI) that allows users of client devices 101-102 to access data analytics services provided by data analytics system 104, such as, for example, forecasting or projection services of tasks (also referred as task data) to be performed in various time periods. For example, a user can request a forecast or prediction on a set of specific tasks or opportunities of a specific time period by specifying one or more attributes associated with the tasks. An attribute can be any person or user of an organization, a time period, a processing or workflow stage, an opportunity age, a forecast category, a role of an organization, a geographic region, a project with a certain potential value (e.g., a deal with a certain deal size), or a particular person associated with a task (e.g., a person performing or managing a particular task or tasks), etc.

In response to a request received via user interface 110 from a client, such as clients 101-102, forecast engine 120 determines a period of time (e.g., a current time period) based on the request that the user is interested in for the forecast. The time period can be a current quarter, week, or year that will end in the near future. Forecast engine 120 further determines a set of one or more attributes, which may be received from a user via user interface 110. Forecast engine 120 retrieves task data associated with the time period and the one or more attributes from data store 130.

Data store 130 stores or caches task data of a variety of tasks, which may be periodically updated from the corresponding data source(s) or data provider(s), in this example, CRM system 105. Alternatively, forecast engine 120 may dynamically access CRM system 105 to query and retrieve the task data. Data stored in data store 130 can be maintained in a variety of data structures, such as tables or databases. Forecast engine 120 can access data store 130 via a variety of application programming interfaces (APIs), database queries, or other suitable communication protocols.

In one embodiment, forecast engine 120 determines one or more past time periods that correspond to the current time period to be forecast. The corresponding past time period would have the same number of days (e.g., business or working days, without weekend or holidays). Forecast engine 120 retrieves task data associated the determined past time periods from data store 130, where the retrieved task data represents one or more tasks that have been performed during the past time periods. Forecast engine 120 calculates a task completion rate of one or more tasks associated with each of the attributes based on the task data of the past time periods. A task completion rate refers to a percentage of the tasks that have been or will be performed and completed during a specific time period. Note that a task can be performed but not completed.

In one embodiment, forecast engine 120 further performs an optimization, such as a smoothing or isotonic regression operation, on the completion rates of the tasks performed in the past time periods. Such an optimization process is to reduce or remove any irregular data or errors. The completion rates of one or more of the past time periods are then applied to the task data of the current time period for forecast purposes. The forecast result represents a probability or percentage of tasks that will be completed or an amount of accomplishment of the tasks recognized (e.g., revenue of a sales deal to be closed) during the current time period. Since the forecast is performed based on historic statistics of the data of past time periods similar to the current time period by forecast engine 120 as part of machine learning, the accuracy of the forecast is greatly improved.

Figure 1B:
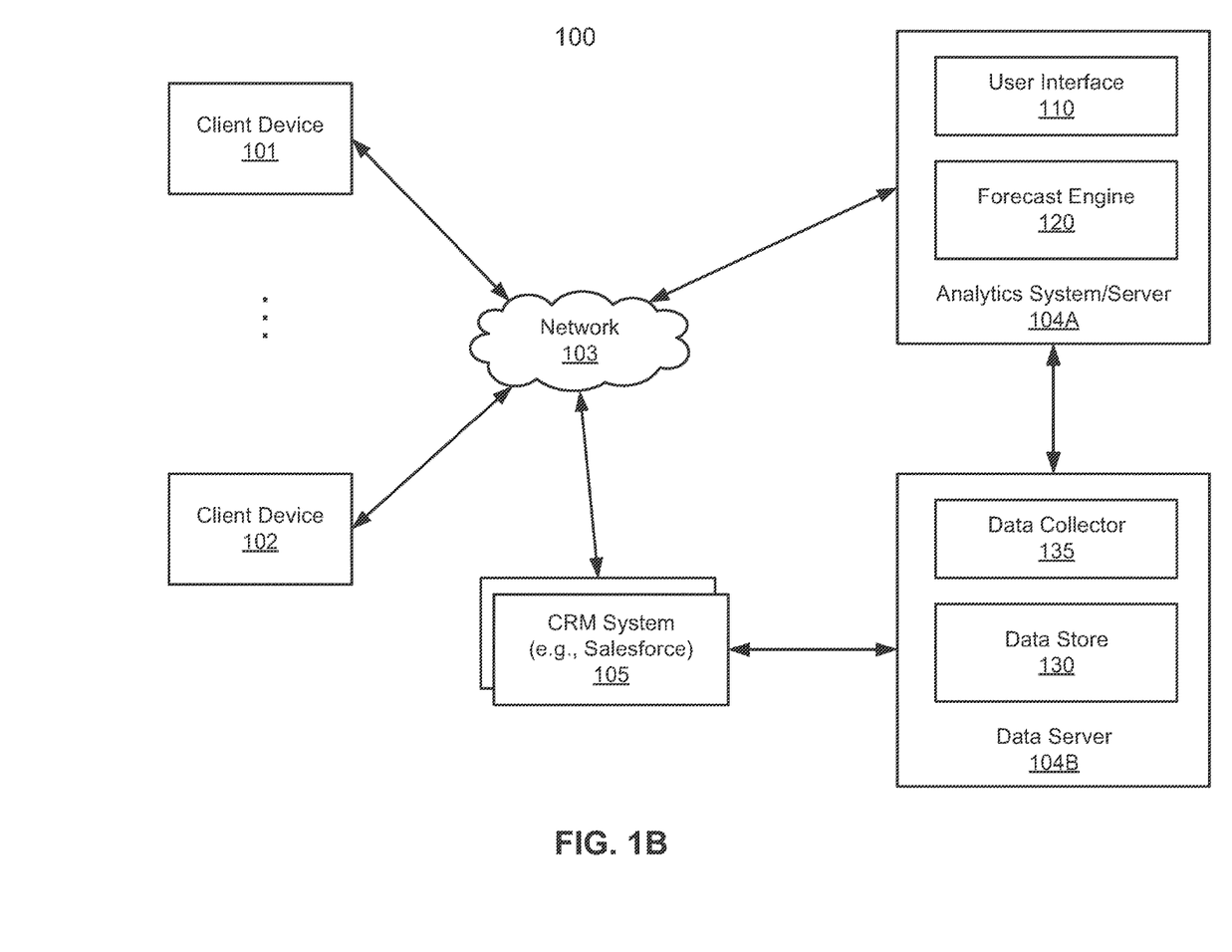

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers. Data store 130 is now maintained by data server 104B. Data server 104B further includes data collector 135 configured to periodically or constantly collect or update task data from data sources 105. Data analytics server 104A communicates with data server 104B using a variety of communication protocols to access task data stored in data store 130.

Figure 2:
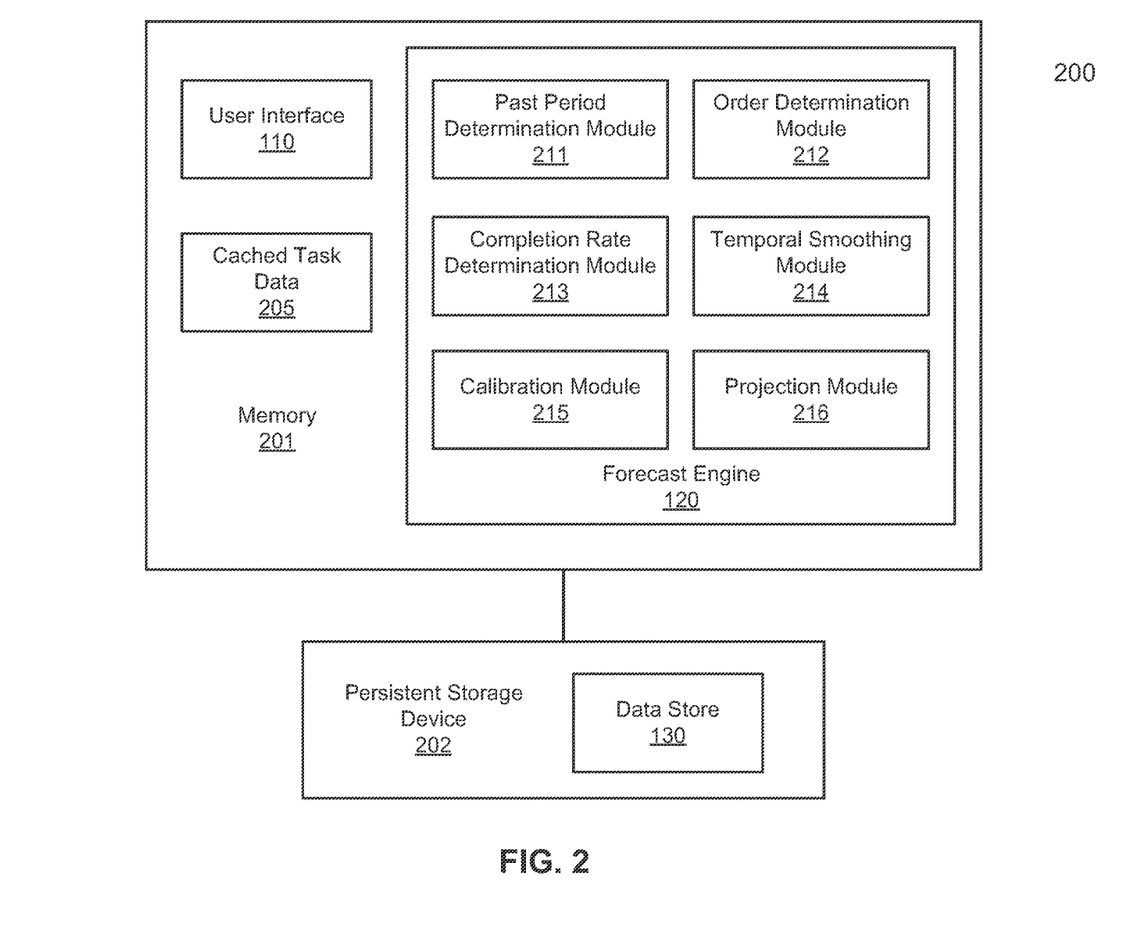
FIG. 2 is a block diagram illustrating an example of a data analytics system according to one embodiment of the invention.

FIG. 2 is a block diagram illustrating an example of a data analytics system according to one embodiment of the invention. System 200 may be implemented as part of data analytics system or server 104. Referring to FIG. 2, system 200 includes user interface 110 and forecast engine 120 loaded in memory 201 and executed by one or more processors (not shown). Data store 130 is stored in persistent storage device 202, such as a hard disk, which may be maintained locally or remotely over a network. At least a portion of task data stored in data store 130 may be cached in memory 201 as part of cached task data 205. In one embodiment, forecast engine 120 includes, but is not limited to, past period determination module 211, attribute order determination module 212, completion rate determination module 213 temporal smoothing module 214, calibration module 215, and projection module 216.

According to one embodiment, a request is received via user interface 110, requesting a forecast of a completion of a set of tasks scheduled to be performed during a current time period (e.g., currently quarter ending Sep. 30, 2016). The request may further specify certain attributes associated with the task data and/or the forecast, such as, for example, forecast categories. In response to the request, past period determination module 211 determines one or more past time periods corresponding to the current time period. For example, given that a current time period is a current quarter (Q) ending on Sep. 30, 2016, a past quarter (Q−1) is a quarter ending Jun. 30, 2106 and Q−2 is a quarter ending Mar. 31, 2016.

In addition, according to one embodiment, past period determination module 211 determines a past time that would have the same number of days as of the current time period. In one embodiment, the number of days within a time period only includes the working or business days (e.g., excluding any non-working days such as weekends, holidays). Further, for the purpose of identifying the corresponding task data, for each of the past periods, a point-in-time (PIT) date is identified corresponding to a current date of the current period (e.g., the date the request is received, i.e., today). The PIT date is selected such that the remaining days from the PIT date to the end of the corresponding past time period are the same as the remaining days from the current date to the end of the current time period (e.g., future days to come).

For example, if today is Aug. 4, 2016 and the current time period (Q) is a quarter ending Sep. 30, 2016, the last quarter (Q−1) will end Jun. 30, 2016 and the corresponding PIT date would be May 5, 2016, in order to have the same number of remaining days in the corresponding quarter. Similarly, for the same quarter ending Sep. 30, 2015 (Q−4), the corresponding PIT date would be Aug. 4, 2015.

Once the past period has been determined, completion rate determination module 213 (also referred to as a completion rate calculator) calculates a completion rate of tasks associated with each of the attributes that have been completed during the past period. In a sales forecast scenario, a task refers to a potential sales deal or sales contract with a financial amount or revenue associated with it. Each of the attributes may represent one of the forecast categories or negotiation stages. Completion rate determination module 213 retrieves the associated task data from data store 130 from persistent storage device 202 (e.g., hard disks), and caches as part of cached task data 205. The task data may be identified and retrieved based on or filtered by the attributes specified by the client. In the example of CRM or sales data, the task data may include sales deals that are associated with one or more forecast categories or sales negotiation stages of the sales deals. For example, the forecast categories may include "closed," "committed," "best case," "pipeline," and "omitted." Each of deals is associated with a deal size in dollars.

Figure 3:
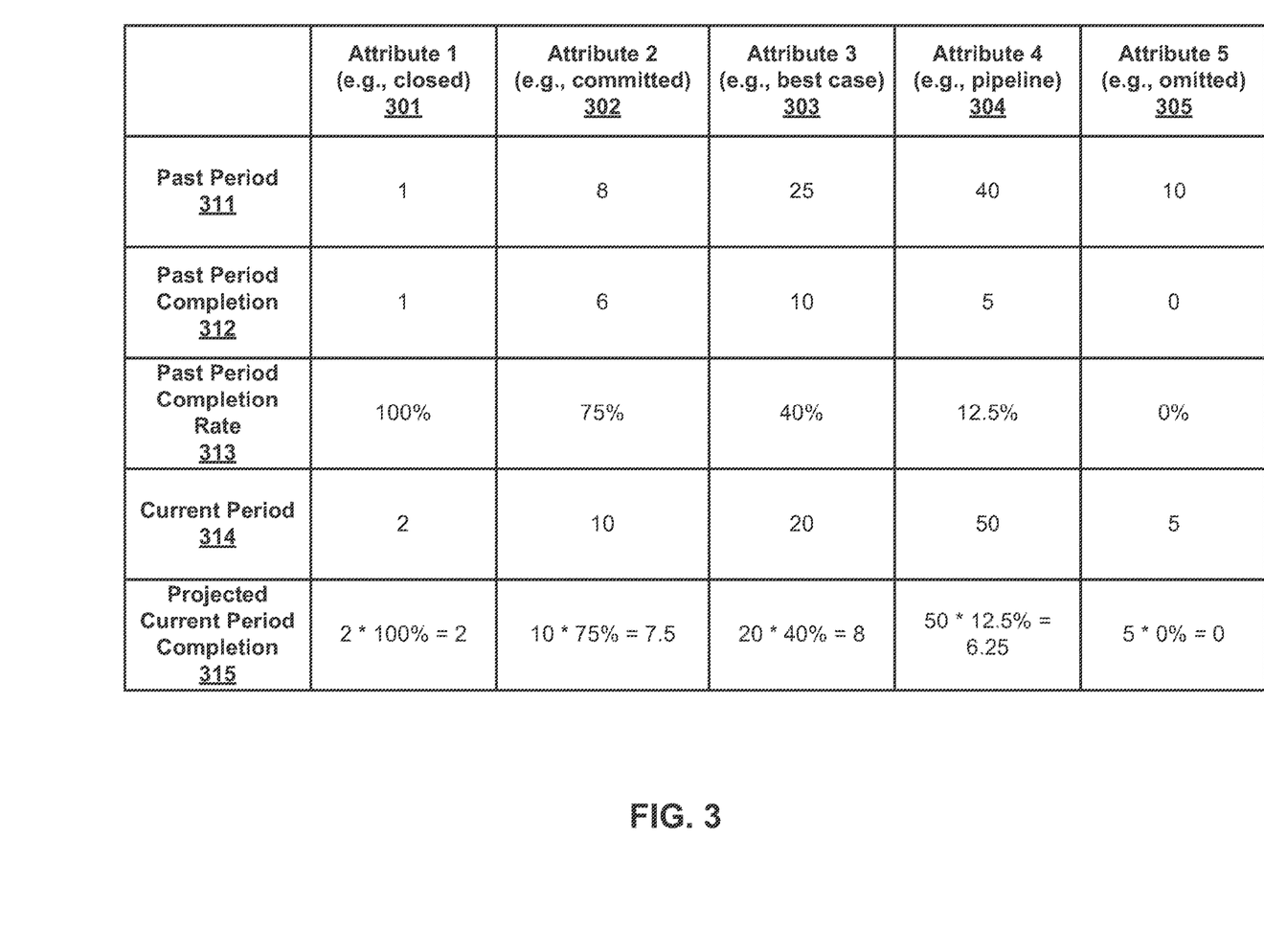
FIG. 3 is a block diagram illustrating a data structure of determining completion rates according to one embodiment of the invention.

Referring now to FIG. 3, it is assumed that a client has specified attributes 301-305 and a specific time period (e.g., a current quarter) for forecasting a completion rate of a set of tasks associated attributes 301-305, for example, via user interface 110 of data analytics system 104. In response to the request, completion rate determination module 213 accesses data store 130 to retrieve the task data of a past period (e.g., last quarter) associated with attributes 301-305. For the purpose of illustration, in this example, a task refers to an opportunity of a sales deal or contract being negotiated or to be negotiated at different stages or categories. The different stages or categories are represented by attributes 301-305. A completed task refers to a sales deal or contract has been closed or signed. Once a sales deal or sales contract has been closed or signed, the corresponding deal size in dollars (also referred to as a task or opportunity value) will be recognized or counted as part of the revenue.

In this example, task or opportunity values associated with attributes 301-305 for past timer period 311 are 1, 8, 25, 40, and 10 million dollars, respectively. Since these deals have been performed and some of the deals have been closed, which may be stored as part of statistics maintained by a CRM system (e.g., CRM systems 105), the amount of sales deals that have been closed can be determined. In this example, the amount of tasks that have been completed for the past period 312 for attributes 301-305 are 1, 6, 10, 5, and 0 million dollars. Based on the original deal size 311 and the closed deal size 312, a task completion rate (also referred to as a win rate) representing a percentage of the deals that have been closed or won can be calculated for each of attributes 301-305 for the past period. In this example, the task completion rates 313 of tasks associated with attributes 301-305 are calculated as of 100%, 75%, 40%, 12.5%, and 0%, respectively. These completion rates or win rates are referred to as raw completion rates or raw win rates for the past period.

The completion rates 313 of a past period can be utilized as a projection guideline for forecasting completion rates of current period 314. For the purpose of illustration, it is assumed that completion rates 313 of the past period are applied to the task data of the current period 314. In this example, the task data for the current period 314 corresponding to attributes 301-305 are 2, 10, 20, 50, and 5 million dollars, respectively. By applying the completion rates 313 to task data of current period 314, the completed amount or closed amount (e.g., recognized revenue) 315 can be calculated for each of attributes 301-305, for example, by projection module 216.

In addition, since the current period has not ended and there may be some new task data that has not been categorized or not included yet in system at present. For the purpose of illustration, it is assumed that there are 10 million dollars as net new tasks. The completion rate for the net new tasks can be estimated based on the completion amount 312 of FIG. 3 of the past period as follows:

Net new deal/existing closed deals of the past period=10/(1+6+10+5)=45.45%

The net new completion rate is then applied to the forecasted task value 315 of FIG. 3 in the current period to forecast the amount of net new deal that will be closed in the current period as (2+7.5+8+6.25)*45.45%. Therefore, the total task value (e.g., revenue) can be calculated as follows:

(2+7.5+8+6.25)*(1+45.45%)

According to one embodiment, referring back to FIG. 2, prior to applying the raw completion rates of a past period to a current period, temporal smoothing module 214 performs a temporal smoothing operation on the completion rates of the past period to smooth any irregular completion rate. In one embodiment, the past period is shifted forward and backward within a predetermined window (e.g., a week) with respect to the PIT date and the completion rates are recalculated for the shifted past period.

For example, assuming the PIT date is May 5, 2016 for the quarter ending Jun. 30, 2016. The predetermined window may be selected as a week surrounding May 5, 2016, i.e., May 2 to May 8, 2016. For each of the shifted periods, a completion rate is calculated. For the purpose of illustration, the five completion rates are obtained: 38%, 35%, 1%, 50%, and 40%, an average completion rate of 32.8% may be selected or alternatively, a median completion rate of 38% may be selected. In this example, the completion rate of 1% may be resulted from a typographical error of the data. For example, if a user mistakenly entered 1 billion dollars instead of 1 million dollars, the corresponding completion rate would have dramatically dropped. By performing a temporal smoothing operation, the impact of such an error can be reduced or eliminated.

According to another embodiment, prior to applying the raw completion rates of a past period to a current period, calibration module 215 performs an isotonic regression operation on the raw completion rates to calibrate the completion rates. In numerical analysis, isotonic regression involves finding a weighted least-squares fit to a vector with weights vector subject to a set of non-contradictory constraints of the kind. Isotonic regression has applications in statistical inference, for example, to fit of an isotonic curve to mean experimental results when an order is expected. A benefit of isotonic regression is that it does not assume any form for the target function, such as linearity assumed by linear regression. Another application is nonmetric multidimensional scaling, where a low-dimensional embedding for data points is sought such that order of distances between points in the embedding matches order of dissimilarity between points. Isotonic regression is used iteratively to fit ideal distances to preserve relative dissimilarity order.

The goal of the calibration is to calibrate the completion rates to match the order of completion rates associated with the attributes against the order of the historic completion rates associated with the attributes. In other words, the calibration is to correct any completion rate that is out of the order (e.g., outliers) in view of other completion rates associated with other attributes based on the historic trend or order of the completion rates associated with the same attributes. The historic trend or order of the completion rates may be determined by order determination module 212 in view of the task completion rates over a long period of time (e.g., year or years), which may be longer than the current period of time requested by the client for consistency and reliability purposes.

For example, for task 1, task 2, and task 3 that went through different stages (represented by attributes), the statistics can be summarized as follows:

Task 1: pipeline→best case→committed→won
Task 2: best case→pipeline→best case→lost
Task 3: pipeline→lost The overall completion rate for a particular attribute is calculated based on the number of attributes that appears in a task that has been won. In this example, attribute "committed" shows up in Task 1 only and Task 1 is won. Attribute "best case" shows up in Task 1 and Task 2, and Task 1 is won and Task is lost. Attribute "pipeline" shows up in two lost tasks and one win task. Thus, the completion rate for "committed" completion rate (committed)=1/1=100%. The completion rate for attribute "best case" completion rate (best case)=½=50%. The completion rate for attribute of "pipeline" completion rate (pipeline)=⅓=33%. Therefore, the historic trend or order of completion rates for these attributes from high to low is: committed>=best case>=pipeline.

Figure 4A:
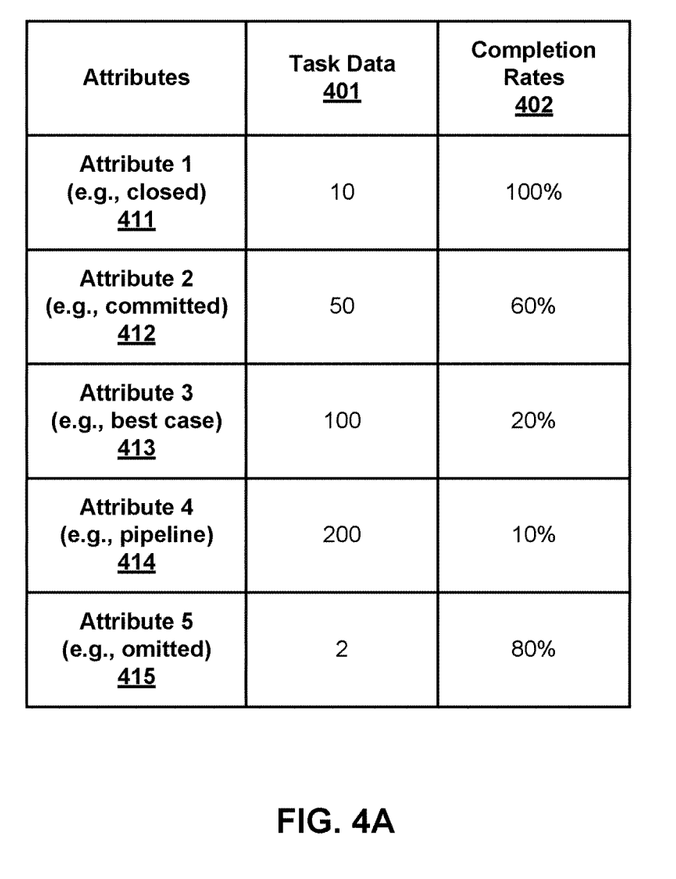
FIGS. 4A and 4B are block diagrams illustrating data structures of calibrating completion rates according to one embodiment of the invention.

For the purpose of illustration, referring now to FIG. 4A, given a particular past time period, task data 401 and associated completion rates 402 associated with attributes 411-415 are determined and listed in table 400. Based on an analysis performed on the historic task data by order determination module 212, it is assumed that the completion rates associated with attributes 411-415 should be:

Rate (411)>=Rate (412)>=Rate (413)>=Rate (414)>=Rate (415)

Figure 4B:
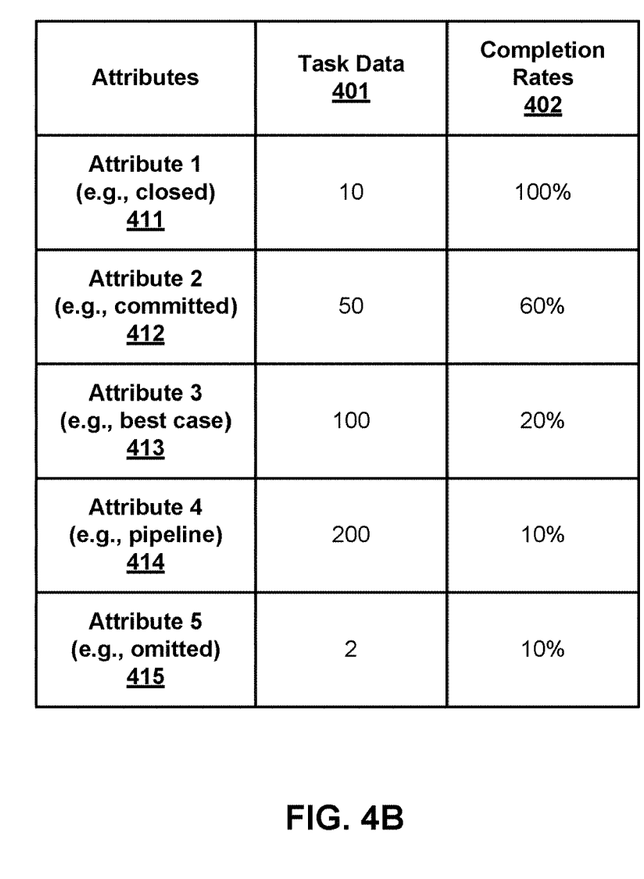

In this example, the completion rate for attribute 415 is clearly out of the order. By performing an isotonic regression, the completion rate for attribute 415 may be modified as shown in FIG. 4B, such that the modified completion rates would conform to the historic trend.

In one embodiment, the isotonic regression can be performed according to the following formula:

$$\min_{x_i} \sum_{i \in \{FC\}} f(n_i)(r_i - x_i)^2$$

subject to $x_1 <= x_2 <= \ldots, x_p$ where variable $r_i$ refers to a raw completion rate, while $x_i$ represents a calibrated completion rate. $n_i$ represents a task value of a particular type of task (e.g., total deal size or number of deals of particular sales deals) to compute corresponding completion rates, and $f(\bullet)$ is a monotonic increasing function with respect to $n_i$. Example functions for $f(n_i)$ could be:

$f(n_i)=n_i$ $f(n_i)=\log(n_i 1)$

The $f(n_i)$ will assign higher weights to the attributes (e.g., forecast categories or FCs) with larger number of task values $n_i$ (e.g., field 401 of FIGS. 4A-4B). In other words, those attributes whose completion rate is more reliable. Naturally, the completion rates of attributes with lower task values, which tend to be outliers, will be corrected. The above isotonic regression formula represents the cost to modify a particular completion rate associated with an attribute. The goal of the optimization is to minimize the overall modification (i.e., the cost) of the calibrated completion rates ($x_i$). In the example as shown in FIGS. 4A-4B, completion rate associated with attribute 415 is modified (e.g., from 80% to 10%), such that the overall modification of overall completion rates for attributes 411-415 is minimized. The calibrated completion rates are then applied to the task data of the current period, in the example of sales data, to predict the revenue of the current period. Note that any one of the temporal smoothing operation and the calibration may be individually applied to the completion rates or alternatively, they can both be applied to the completion rates.

Figure 5:
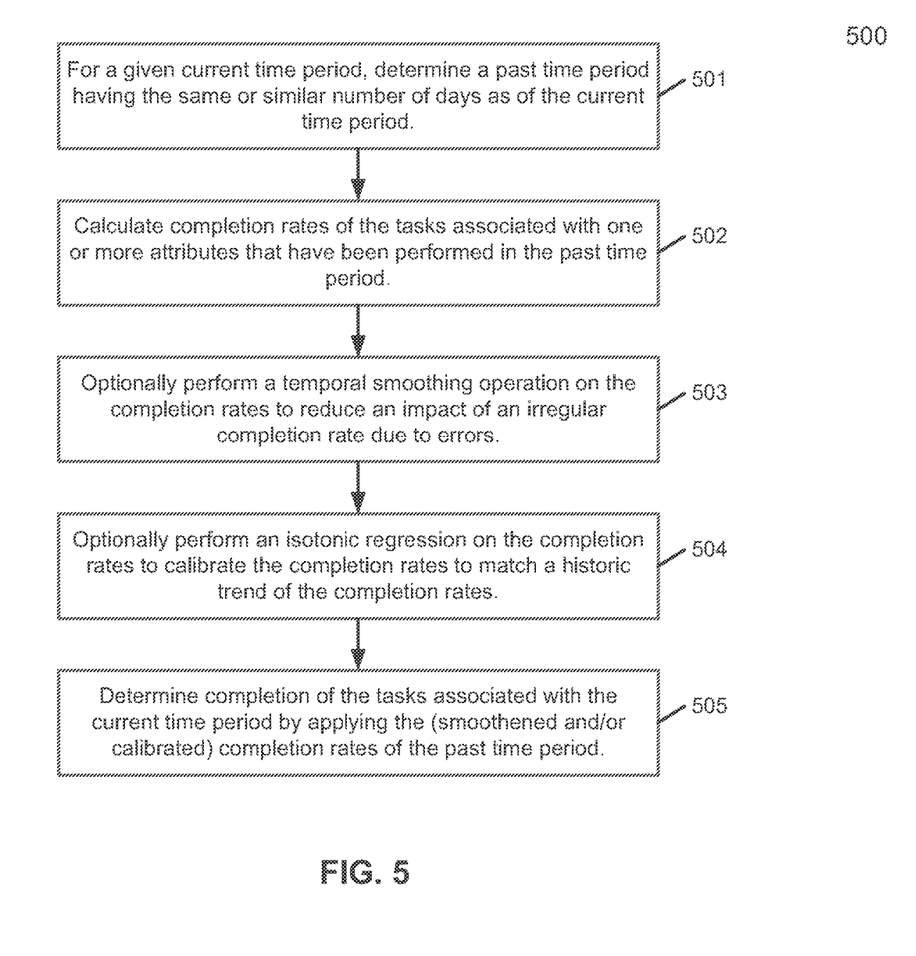
FIG. 5 is a flow diagram illustrating a process of predicting completion of tasks to be performed during a time period according to one embodiment of the invention.

FIG. 5 is a flow diagram illustrating a process of predicting completion rates of tasks to be performed during a time period according to one embodiment of the invention. Process 500 may be performed by processing logic which may include software, hardware, or a combination thereof. For example, process 500 may be performed by forecast engine 120 of FIG. 2. Referring to FIG. 5, at block 501, for a given current time period (e.g., current quarter Q), processing logic determines a past time period (e.g., Q–1, Q–2, . . . Q–n) that has the same or similar number of days (e.g., business or working days) as of the current time period. At block 502, processing logic determines completion rates of tasks (e.g., win rates of sales deals or contracts) associated with one or more attributes (e.g., forecast categories or processing stages), where the tasks have been performed during the past time period.

At block 503, processing logic may perform a temporal smoothing operation on the completion rates to reduce an impact of an irregular completion rate due to errors (e.g., typographical errors). At block 504, processing logic may further perform an isotonic regression operation on the completion rates to calibrate the completion rates to align with the historic trend of the completion rates. At block 505, processing logic predicts the completion of the tasks (e.g., revenue) of the current time period by applying the (optionally smoothened and/or calibrated) completion rates of the past time period to the task data of the current time period.

As described above, a forecast of a current period can be based on completion rates of attributes of a past period. The accuracy of the forecast may depend on which of the past periods the forecast is based. In other words, the forecast of the current period can vary dependent upon which of the past periods is based. In reality, past time periods demonstrate both seasonality and trend. For example, four quarters of a year tend to have different sales patterns. According to another aspect of the invention, the forecast may be performed based on the completion rates of tasks over multiple past time periods. Each of the past time periods may be assigned with a weight factor or weight coefficient indicating the similarity of the trend of task data between the past time period and the current time period. The forecast of the current time period may be performed based on the weighted completion rates of multiple past time periods. Alternatively, one of the past time period having the most similar trend as of the current time period may be selected for prediction purposes.

According to one embodiment, in order to determine which past time period is more similar to the current time period, each time period is represented by a vector that is generated based on the task data of tasks (e.g., deal sizes of deals) for the corresponding time period. The vector can be task data of a time unit (e.g., current day) or multiple time units prior to one particular time (e.g., past 1 week). The vector may be generated by normalizing the task data. The vector of the current time period is compared with the vector of each of the past time periods to determine which of the past time period is more similar to the current time period. The completion of a past time period that is more similar to the current time period may be given a heavier weight factor or coefficient in forecasting the current time period.

Figure 6:
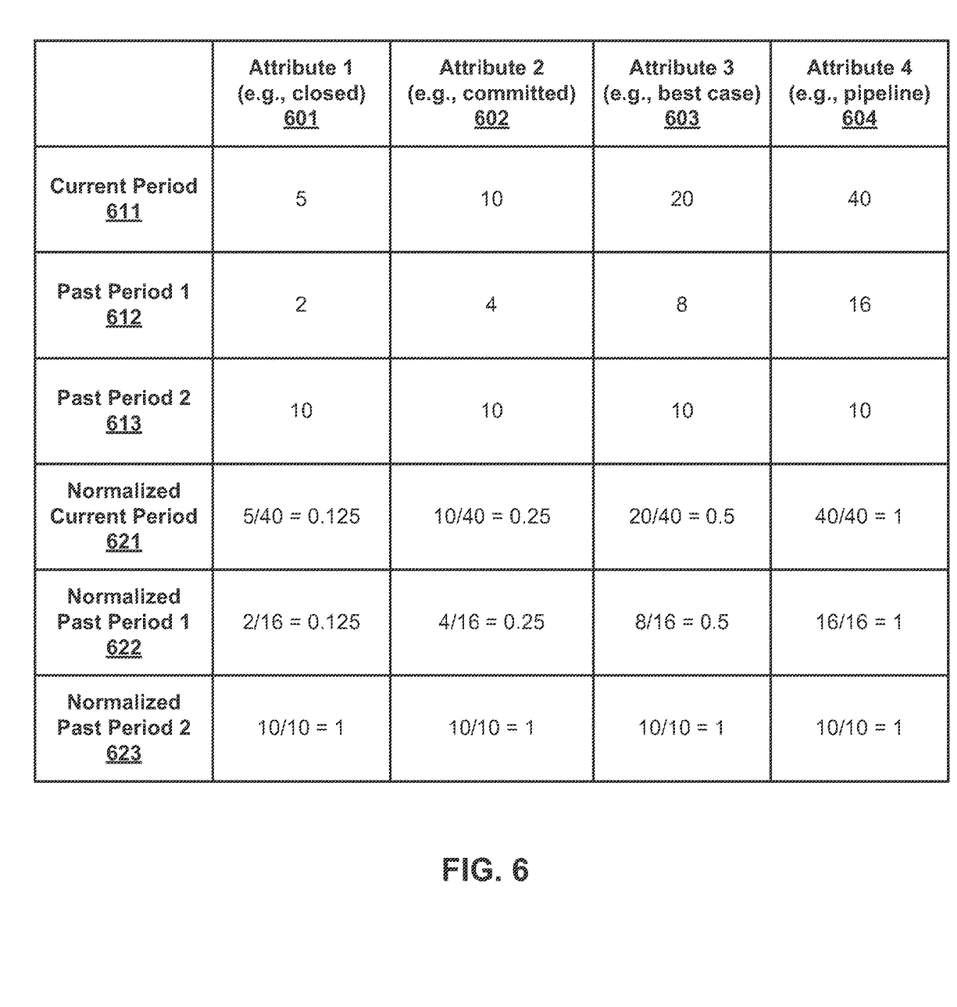
FIG. 6 is a block diagram illustrating a data structure of determining a trend of task data according to one embodiment of the invention.

For the purpose of illustration, referring now to FIG. 6, the task data (e.g., deal size of deals) associated with attributes 601-604 are identified for current period 611, first past period 612, and second past period 613. Although there are only two past periods 612-613, more past periods can also be applied. For simplicity, the vectors are defined to be task data of a single time unit. For each of the periods 611-613, the task data is normalized to generate a vector by dividing each value by their largest value as shown in vectors 621-623, respectively. For example, for period 611, their larges value is 40. Thus, each of the values associated with attributes 601-604 is divided by 40 to generate normalized values 621.

Based on the normalized vectors 621-623, it can be seen that the trend of past period 612 is more similar to current period 611. Thus, the completion rates of past period 612 may be selected to be applied to the task data of current period 611. Alternatively, the completion rates of both past periods 612-613 may be utilized, but each is associated with a specific or different weight factor when applying to current period 611. Since past period 612 is more similar to current period 611, the weight factor for past period 612 is heavier than past period 613.

In one embodiment, an optimization is performed on the vectors of the current period and the past periods to determine the weight factors or coefficients for the past periods. In one particular embodiment, the optimization can be performed using the following function:

$$\min \left\| v_{curQ} - \sum_{pastQ} w_{pastQ} v_{pastQ} \right\|^2 + \lambda \|w\|^2$$

s.t. $w_{pastQ} \geq 0$

-continued $$\sum w_{pastQ} \leq c$$

where c is a positive constant indicating the general trend. Constant c=1 means there is no significant trend change; c>1 means the win rates are trending up; and c<1 means the win rates are trending down.

In this formula, a quarter is utilized as an example of a past time period, however, other types of time periods may also be applied. $v_{curQ}$ represents a vector of a current time period (e.g., vector 621 of FIG. 6), while $v_{pastQ}$ represents a vector of a past time period (vector 622 or 623). $w_{pastQ}$ or simply W represents a weight factor for a particular past time period. Constant $\lambda$ can be adjusted. The above formula is to determine a weight factor for each of the past period such that the difference between the $v_{curQ}$ and ($\Sigma w_{pastQ} v_{pastQ}$) is minimized.

The final projection may be calculated based on the weighted sum of the projections of the past time periods as follows:

$$\text{Projection} = \Sigma w_{pastQ} p_{pastQ}$$

where $p_{pastQ}$ represents the projection based on the completion rate of a particular past period (e.g., completion rate of a past period*task data of the current period), in this example, a past quarter.

Figure 7:
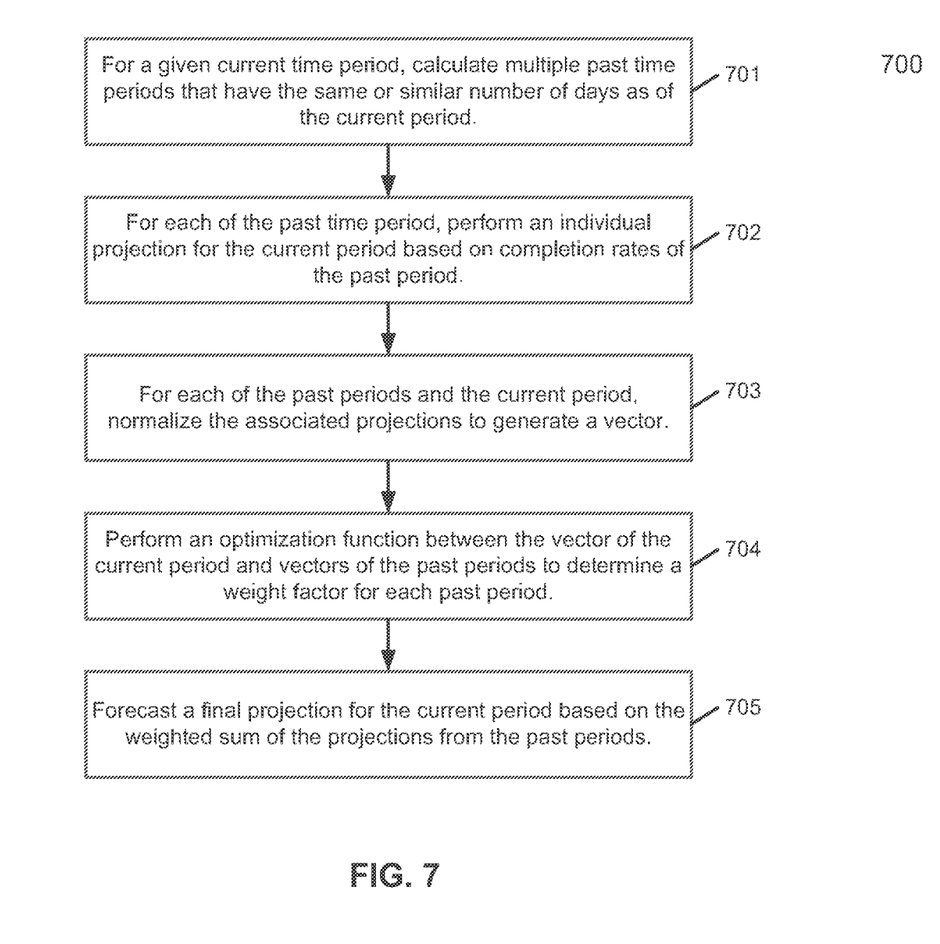
FIG. 7 is a flow diagram illustrating a process of predicting completion rates of tasks to be performed during a time period according to one embodiment of the invention.

FIG. 7 is a flow diagram illustrating a process of predicting completion rates of tasks to be performed during a time period according to one embodiment of the invention. Process 700 may be performed by processing logic which may include software, hardware, or a combination thereof. For example, process 700 may be performed by forecast engine 120 of FIG. 2. Referring to FIG. 7, at block 701, for a given current time period, processing logic determines a list of past time periods, each having the same or similar number of days as of the current period. At block 702, for each of the past periods, processing logic determines task data of tasks (e.g., deal size of deals) associated with one or more attributes (e.g., forecast categories) that have been performed in the corresponding past period. At block 703, for each past period and the current period, processing logic normalizes the task data to generate a vector. At block 704, processing logic performs an optimization function between the vector of the current period and vectors of the past periods to determine a weight factor for each of the past periods. At block 705, processing logic performs a final projection of the current period based on the weighted sum of projections of the past periods.

Note that some or all of the components as shown and described above (e.g., forecast engine 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
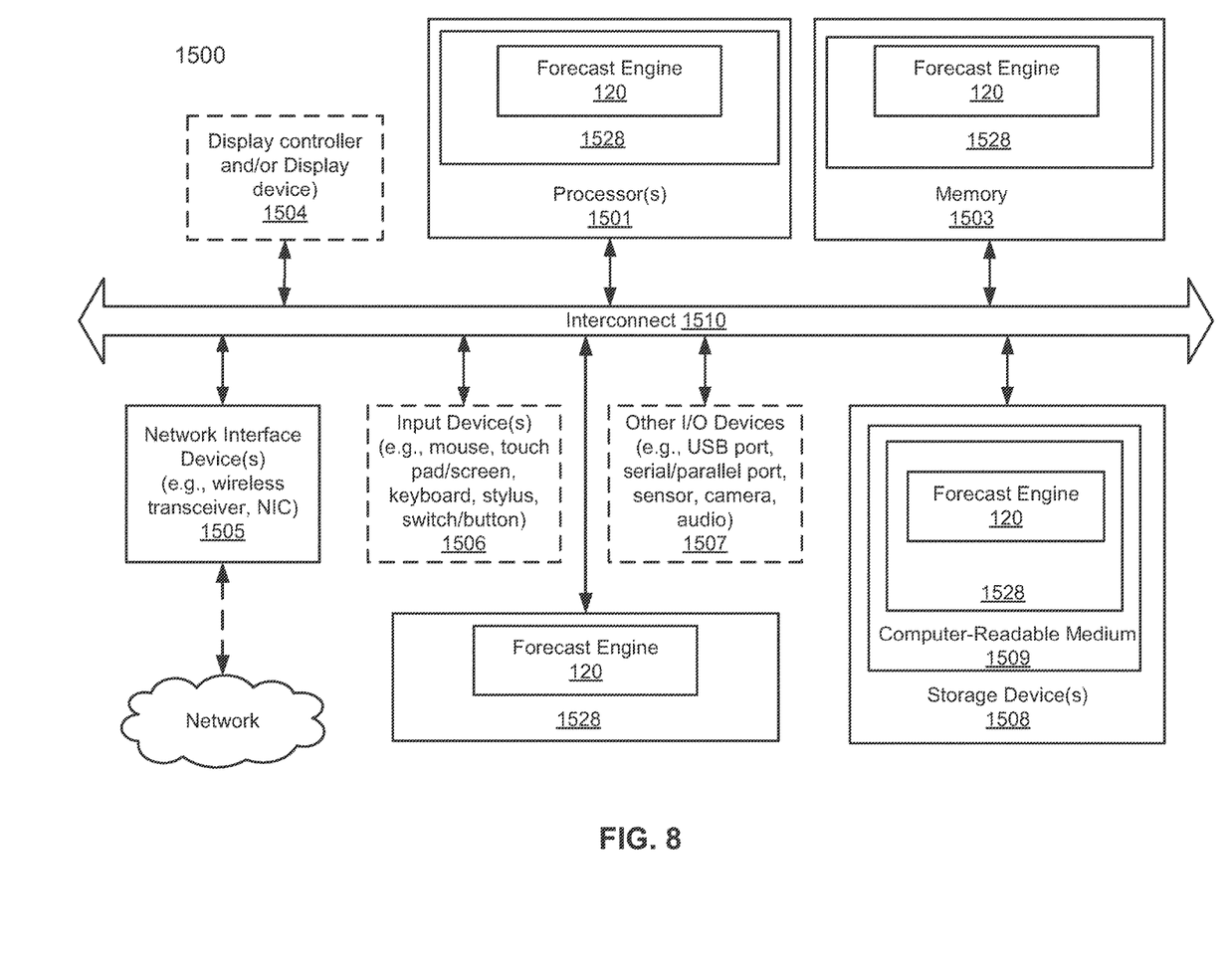
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, client devices 101-102 and servers 104-105 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for predicting task completion, the method comprising the operations of:

receiving a request from a client for predicting task completion rates for a first set tasks, each of the first set of tasks associated with one or more of a plurality of attributes and scheduled to be performed within a first time period, wherein each of the plurality of attributes represents a task processing stage;

in response to the request, calculating, for each of the plurality of attributes, a completion rate of one or more of a second set of tasks that are associated with the attribute, wherein the second set of tasks have been performed during a second time period in the past, wherein the completion rate represents a percentage of the one or more tasks associated with the attribute that have been completed during the second timer period, wherein the completion rate for each of the plurality of attributes is smoothed by averaging completion rates of the respective attribute within a plurality of predetermined time windows shifted forward and backward for dates surrounding a given date within the second time period;

performing an isotonic regression operation on completion rates associated with the plurality of attributes of the second set of tasks that have been performed during the second time period to calibrate the calculated completion rates, wherein calibrating the calculated completion rates includes adjusting the calculated completion rates against a determined monotonic historical trend of completion rates of the plurality of attributes associated with tasks during a plurality of time periods in the past;

determining, for each of the plurality of attributes, one or more tasks from the first set of tasks that are associated with that attribute;

predicting a completion rate for the one or more determined tasks associated with the attribute based on a calibrated rate of the completion rates corresponding to that attribute; and iteratively, for a predetermined number of iterations, performing the operations of receiving a request, calculating a completion rate, performing an isotonic regression, determining one or more tasks, and predicting a completion rate;

wherein, for each iteration of the predetermined number of iterations, a new set of tasks are used as the first set of tasks; and wherein, for each iteration of the predetermined number of iterations, the first set of tasks and the second set of tasks for a preceding iteration are merged and used as the second set of tasks for that iteration of the predetermined number of iterations.

2. The method of claim 1, wherein the first time period and the second time period have the same number of days, and wherein the first time period and the second time period end on the same calendar day of a month.

3. The method of claim 1, further comprising determining a trend of completion rates for a plurality of tasks associated with the attributes that have been performed in a plurality of time periods in the past, wherein the completion rates of tasks associated with the second time period are calibrated according to the determined trend of completion rates in the past.

4. The method of claim 3, wherein performing an isotonic regression operation on the completion rates associated with the attributes comprises modifying at least one of the completion rates according to the trend of completion rates, such that the completion rates of the attributes of the second set of tasks are aligned with the trend of completion rates.

5. The method of claim 4, wherein performing an isotonic regression operation on the completion rates associated with the attributes further comprises applying an optimization function to the completion rates.

6. The method of claim 1, further comprising calculating completion rates of the attributes for a plurality of past time periods, the second time period being one of the plurality of past time periods, wherein predicting completion rates for the attributes of the first set of tasks is performed based on the completion rates of the plurality of past time periods.

7. The method of claim 6, further comprising:

normalizing opportunity data of the attributes associated with the current time period to generate a current opportunity vector;

for each of the past time periods, normalizing opportunity data of the attributes corresponding to the past time period to generate a past opportunity vector, determining a weight factor for the past time period based on a comparison between the current opportunity vector and the past opportunity vector; and predicting the completion rates for the attributes of the first set of tasks based on completion rates of the past time periods in view of the corresponding weight factors.

8. A non-transitory machine-readable medium having instructions stored therein, which when executed by a processor, cause the processor to perform operations of predicting task completion of a plurality of tasks, the operations comprising the operations of:

receiving a request from a client for predicting task completion rates for a first set tasks, each of the first set of tasks associated with one or more of a plurality of attributes and scheduled to be performed within a first time period, wherein each of the plurality of attributes represents a task processing stage;

in response to the request, calculating, for each of the plurality of attributes, a completion rate of one or more of a second set of tasks that are associated with the attribute, wherein the second set of tasks have been performed during a second time period in the past, wherein the completion rate represents a percentage of the one or more tasks associated with the attribute that have been completed during the second timer period, wherein the completion rate for each of the plurality of attributes is smoothed by averaging completion rates of the respective attribute within a plurality of predetermined time windows shifted forward and backward for dates surrounding a given date within the second time period;

performing an isotonic regression operation on the completion rates associated with the plurality of attributes of the second set of tasks that have been performed during the second time period to calibrate the calculated completion rates, wherein calibrating the calculated completion rates includes adjusting the calculated completion rates against a determined monotonic historical trend of completion rates of the plurality of attributes associated with tasks during a plurality of time periods in the past;

determining, for each of the plurality of attributes, one or more tasks from the first set of tasks that are associated with that attribute;

predicting a completion rate for the one or more determined tasks associated with that attribute based on a calibrated rate of the completion rates corresponding to that attribute; and iteratively, for a predetermined number of iterations, performing the operations of receiving a request, calculating a completion rate, performing an isotonic regression, determining one or more tasks, and predicting a completion rate;

wherein, for each iteration of the predetermined number of iterations, a new set of tasks are used as the first set of tasks; and wherein, for each iteration of the predetermined number of iterations, the first set of tasks and the second set of tasks for a preceding iteration are merged and used as the second set of tasks for that iteration of the predetermined number of iterations.

9. The machine-readable medium of claim 8, wherein the first time period and the second time period have the same number of days, and wherein the first time period and the second time period end on the same calendar day of a month.

10. The machine-readable medium of claim 8, wherein the operations further comprise determining a trend of completion rates for a plurality of tasks associated with the attributes that have been performed in a plurality of time periods in the past, wherein the completion rates of tasks associated with the second time period are calibrated according to the determined trend of completion rates in the past.

11. The machine-readable medium of claim 10, wherein performing an isotonic regression operation on the completion rates associated with the attributes comprises modifying at least one of the completion rates according to the trend of completion rates, such that the completion rates of the attributes of the second set of tasks are aligned with the trend of completion rates.

12. The machine-readable medium of claim 11, wherein performing an isotonic regression operation on the completion rates associated with the attributes further comprises applying an optimization function to the completion rates.

13. The machine-readable medium of claim 8, wherein the operations further comprise calculating completion rates of the attributes for a plurality of past time periods, the second time period being one of the plurality of past time periods, wherein predicting completion rates for the attributes of the first set of tasks is performed based on the completion rates of the plurality of past time periods.

14. The machine-readable medium of claim 13, wherein the operations further comprise:
  normalizing opportunity data of the attributes associated with the current time period to generate a current opportunity vector;
  for each of the past time periods,
    normalizing opportunity data of the attributes corresponding to the past time period to generate a past opportunity vector,
    determining a weight factor for the past time period based on a comparison between the current opportunity vector and the past opportunity vector; and
  predicting the completion rates for the attributes of the first set of tasks based on completion rates of the past time periods in view of the corresponding weight factors.

15. A data processing system, comprising:
  a processor; and
  a memory coupled to the processor to store instructions, which when executed by the processor, cause the processor to perform operations of predicting task completion of a plurality of tasks, the operations including
    receiving a request from a client for predicting task completion rates for a first set tasks, each of the first set of tasks associated with one or more of a plurality of attributes and scheduled to be performed within a first time period, wherein each of the plurality of attributes represents a task processing stage;
    in response to the request, calculating, for each of the plurality of attributes, a completion rate of one or more of a second set of tasks that are associated with the attribute, wherein the second set of tasks have been performed during a second time period in the past, wherein the completion rate represents a percentage of the one or more tasks associated with the attribute that have been completed during the second timer period, wherein the completion rate for each of the plurality of attributes is smoothed by averaging completion rates of the respective attribute within a plurality of predetermined time windows shifted forward and backward for dates surrounding a given date within the second time period;
    performing an isotonic regression operation on the completion rates associated with the plurality of attributes of the second set of tasks that have been performed during the second time period to calibrate the calculated completion rates, wherein calibrating the calculated completion rates includes adjusting the calculated completion rates against a determined monotonic historical trend of completion rates of the plurality of attributes associated with tasks during a plurality of time periods in the past;
    determining, for each of the plurality of attributes, one or more tasks from the first set of tasks that are associated with that attribute;
    predicting a completion rate for the one or more determined tasks associated with that attribute based on a calibrated rate of the completion rates corresponding to that attribute; and
    iteratively, for a predetermined number of iterations, performing the operations of receiving a request, calculating a completion rate, performing an isotonic regression, determining one or more tasks, and predicting a completion rate;
    wherein, for each iteration of the predetermined number of iterations, a new set of tasks are used as the first set of tasks; and
    wherein, for each iteration of the predetermined number of iterations, the first set of tasks and the second set of tasks for a preceding iteration are merged and used as the second set of tasks for that iteration of the predetermined number of iterations.

16. The system of claim 15, wherein the first time period and the second time period have the same number of days, and wherein the first time period and the second time period end on the same calendar day of a month.

17. The system of claim 15, wherein the operations further comprise determining a trend of completion rates for a plurality of tasks associated with the attributes that have been performed in a plurality of time periods in the past, wherein the completion rates of tasks associated with the second time period are calibrated according to the determined trend of completion rates in the past.

18. The system of claim 17, wherein performing an isotonic regression operation on the completion rates associated with the attributes comprises modifying at least one of the completion rates according to the trend of completion rates, such that the completion rates of the attributes of the second set of tasks are aligned with the trend of completion rates.

19. The system of claim 18, wherein performing an isotonic regression operation on the completion rates associated with the attributes further comprises applying an optimization function to the completion rates.

* * * * *